United States Patent [19]

Sugitani et al.

[11] Patent Number: 4,876,432
[45] Date of Patent: Oct. 24, 1989

[54] METHOD FOR CONTROLLING A PENETRATION BEAD

[75] Inventors: Yuji Sugitani; Yoshikazu Sato; Yasuhiko Nishi, all of Tokyo, Japan

[73] Assignee: NKK Corporation, Tokyo, Japan

[21] Appl. No.: 211,963

[22] Filed: Jun. 27, 1988

[30] Foreign Application Priority Data

Jul. 10, 1987 [JP] Japan .................................. 62-171194

[51] Int. Cl.$^4$ ................................................ B23K 9/12
[52] U.S. Cl. .............................. 219/124.32; 219/124.1
[58] Field of Search ............. 219/124.32, 124.1, 124.5, 219/124.22

[56] References Cited

U.S. PATENT DOCUMENTS 3,264,447  8/1966  Agnew ........................... 219/124.22
4,005,308  1/1977  Chaney et al. ..................... 219/124.5
4,210,264  7/1980  Kondo .................................. 222/591

Primary Examiner—Clifford C. Shaw
Attorney, Agent, or Firm—Frishauf, Holtz, Goodman & Woodward

[57] ABSTRACT

A method for controlling a penetration bead, in an automatic one-side gas shielded arc welding wherein the backing material is adhered to the back of work pieces along a weld line and the welding is effected automatically from the surface side of the work pieces, comprises: putting an electrically conductive material on the surface of the backing material in the longitudinal direction; detecting a voltage between the work pieces and the electrically conductive material during the welding and controlling the voltage to be a predetermined reference voltage. The voltage is controlled by comparing the reference voltage and the detected voltage to obtain their difference and by correcting a speed of a travelling carriage which corresponds to the difference voltage to let the detected voltage be equal to the reference voltage. The electrically conductive material is one selected from a metallic foil tape, a metallic net and a wire.

15 Claims, 5 Drawing Sheets

METHOD FOR CONTROLLING A PENETRATION BEAD

BACKGROUND OF THE INVENTION

1. Field of the Invention

The present invention relates to a method for controlling a penetration bead in an automatic one-side gas shielded arc welding.

2. Description of the Prior Art

A prior art automatic one-side gas shielded arc welding method is shown in FIG. 1. Backing material 2 comprising solid flux or ceramics is adhered to the back of work pieces 1 along a weld line by a backing copper plate 3. Backing material 2 melts during welding and turns into slag 4 which protects a penetration bead. An electric current is sent to electrode wire 5 through electrode tip 7. Electrode wire 5 is fed continuously by feed roller 6. The welding is effected by arc 10 being generated in an atmosphere of shielding gas 9 which is supplied from gas nozzle 8. A welding apparatus is moved by a travelling carriage (not shown) in the direction of the welding as the welding goes on.

The prior art automatic one-side gas shielded arc welding method as mentioned above is used widely for welding a structure which can not be turned over. In this case, however, non-uniformity of the penetration bead occurs due to the differences of root gap. In order to remove such defects, the following two methods have been used:

(a) Weld parameters such as a welding speed are change by manual control of a worker during the welding.

(b) The root gap of the portions to be welded is formed very accurately in advance.

The first method requires a high skill. For example, when a giant structure such as a ship is welded with an automatic one-side gas shielded arc welding method, it is impossible to observe the back of a welded portion and to grasp the conditions thereof. Therefore, the worker relies upon his experience and individual workmanship. Accordingly, the formation of a uniform penetration bead is attended with difficulties and requires an accumulated high skill. The second method has disadvantages in that it is difficult to maintain the accuracy necessary for a giant structure because the required accuracy of the root gap is approximately ±1 mm.

SUMMARY OF THE INVENTION

It is an object of the present invention to provide a method for controlling a penetration bead wherein a uniform penetration bead can be formed without being affected by the accuracy of the root gap.

To attain the above-mentioned object, the present invention provides a method for controlling a penetration bead, in an automatic one-side gas shielded arc welding wherein a backing material is adhered to the back of the work pieces along a weld line and the welding is effected automatically from the surface side of the work pieces, comprises: putting an electrically conductive material on the surface of the backing material in the longitudinal direction; detecting voltage between the work pieces and the electrically conductive material during the welding to control the voltage to become a predetermined reference voltage.

DESCRIPTION OF THE PREFERRED EMBODIMENT

Figure 1:
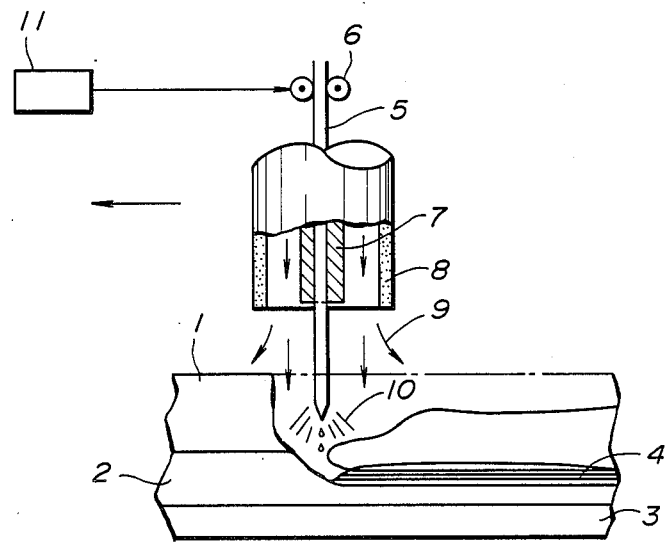
FIG. 1 is a side elevation illustrating a prior art gas shielded arc welding.
Figure 2:
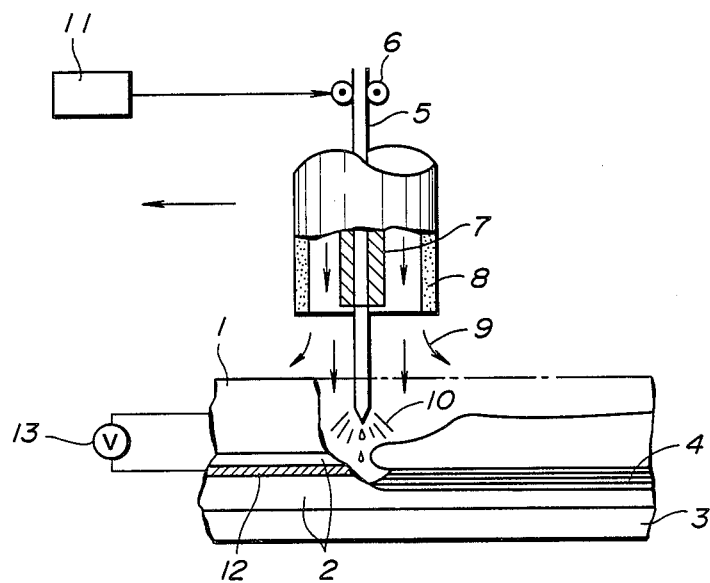
FIG. 2 is a side elevation illustrating a gas shielded arc welding of the present invention.
Figure 3:
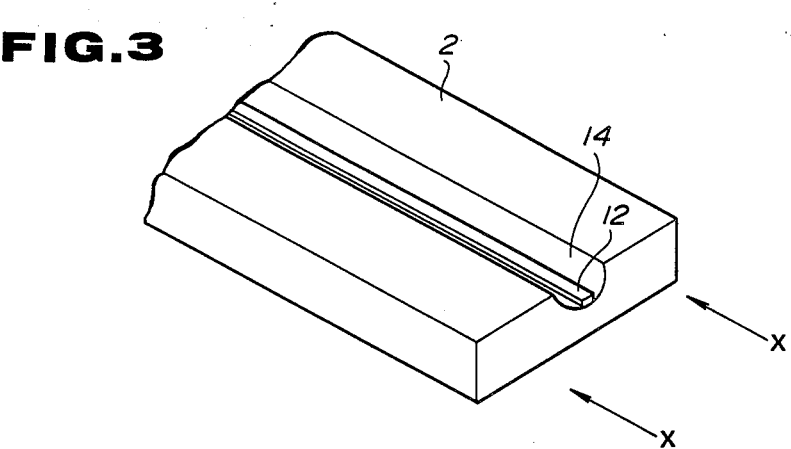
FIG. 3 is a perspective view illustrating the backing material of the present invention.

FIG. 2 is a side elevation illustrating a gas shielded arc welding according to the present invention. Backing material 2 comprising solid flux or ceramics is adhered to the back of work pieces 1 along a weld line by backing copper plate 3. Electrically conductive material 12 as shown in FIG. 3 is placed closely on the surface of slot 14 for forming the penetration bead in the longitudinal direction which runs in the center of backing material 2. This electrically conductive material 12 is melted successively, coming into touch with arc or molten metal, and turns into a weld bead. Backing material 2 melts and turns into slag 4 during welding to protect the penetration bead. An electric current is sent to electrode wire 5 through electrode tip 7. Electrode wire 5 is fed continuously by feed roller 6. The welding is effected by arc 10 being generated in an atmosphere of shielding gas 9 which is supplied from gas nozzle 8. An electrode apparatus 5 is moved by a travelling carriage (not shown) in the direction of the welding as the welding goes on. A voltage between work pieces 1 and electrically conductive material 12 is measured by means of voltmeter 13.

When the welding begins, arc 10, which leaks from a pair of work pieces 1, reaches electrically conductive material 12, and voltage Vd is generated between work pieces 1 and electrically conductive material 12. The present invention makes use of a good correlation between the voltage Vd and the form of the penetration bead.

Figure 4:
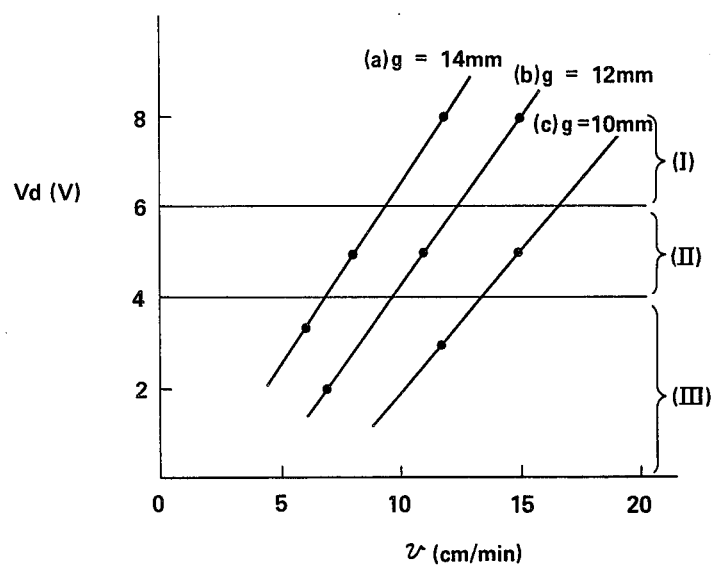
FIG. 4 is a graph showing a voltage arising between work pieces and an electrically conductive material, and a shape of the penetration bead corresponding to the voltage when a welding speed is varied according to the present invention.

FIG. 4 graphically shows voltage Vd and a shape of the penetration bead corresponding to the voltage Vd, the voltage is detected at the time of varying welding speed V, providing that a root gap for a narrow gas welding is constant. The detected voltage Vd(V) is indicated the axis of ordinates and the welding speed V (cm/min.) by the axis of abscissa. The other welding conditions are shown below:

Work pieces (1): a steel sheet having a V-shaped bevel joint with 12 mm thickness and 50° C. in bevel Backing material (2): ceramics Electrically conductive material (3): metallic foil tape of 3 mm in width and 0.2 mm in thickness Electric current/arc voltage: 250A/30V (direct current)

Electrode wire (5): solid wire of 1.2 mm in diameter

Shielding gas (9): mixed gas consisting of 80% of argon gas and 20% of carbon dioxide gas Root gap: (a): 14 mm; (b) 12 mm; and (c): 10 mm In FIG. 4, an excessive penetration bead is formed in the zone (I) where the detected voltage Vd exceeds 6 V. A good and fine penetration bead is obtained in the zone (II) where the detected voltage Vd is from 4 to 6 V. An insufficient penetration bead is formed in the zone (III) where the detected voltage Vd is less than 4 V. In this way, the detected voltage between work pieces 1 and electrically conductive material 3, and the shape of the penetration bead have a good correlation. If this correlation is utilized, a reference voltage Vo, which can form a good penetration in the zone (II), can be set forth. Accordingly, if weld parameters are controlled so as to let the detected voltage Vd be a reference voltage Vo, a good penetration bead can be formed over the whole length of a weld line regardless of the accuracy of the root gap. If attention is paid to the fact that the detected voltage Vd and the welding speed V have a linear relation, the detected voltage can be controlled by controlling the welding speed V. In FIG. 4, for example, it proves to be apparent that a good penetration bead can be obtained if the welding speed is controlled at 15 cm/min., when the root gap is 10 mm. From the above-mentioned, it proves to be clear that an on-line control of a penetration bead, which has never been practiced conventionally, can be conducted.

Figure 5:
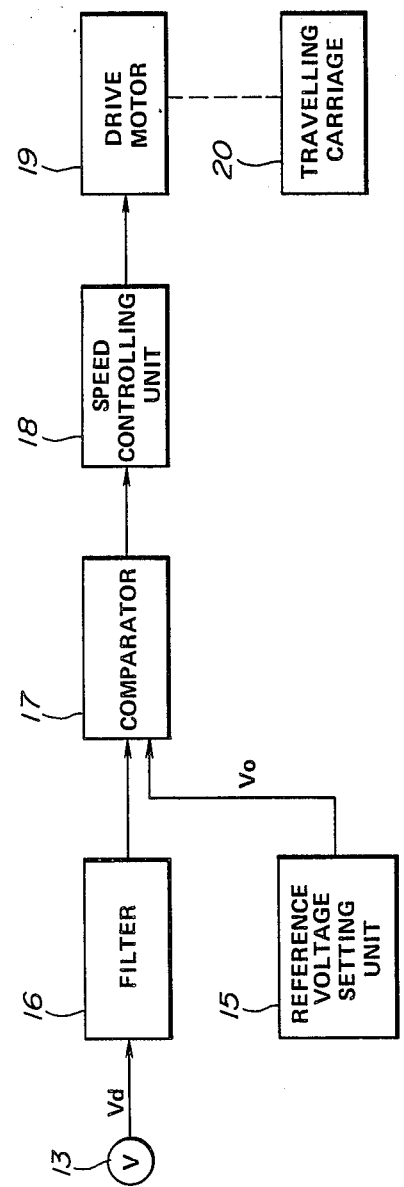
FIG. 5 is a block diagram of a control system of the present invention.
Figure 6:
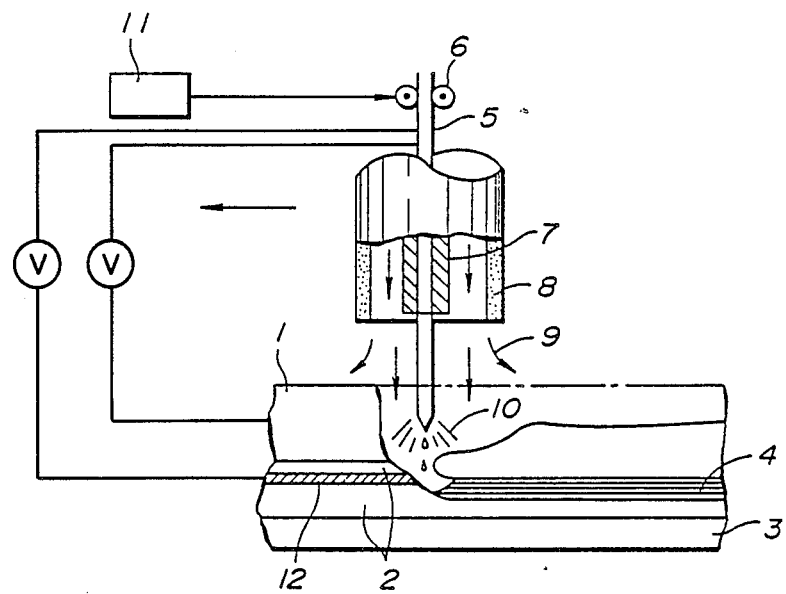
FIG. 6 is a side elevation, similar to FIG. 2, showing a modified embodiment of the invention.

FIG. 5 is a block diagram of the control system of the present invention. Reference voltage Vo is inputted in advance to reference voltage setting unit 15. The signal Vd being detected by voltmeter 13, the noise of which is removed by filter 16, is inputted to comparator 17 and compared with a reference voltage signal Vo of the reference voltage setting unit. Comparator 17 outputs a difference signal showing a balance between the detected voltage signal Vd and the reference voltage signal Vo into speed controlling unit 18. Speed controlling unit 18 outputs a speed correcting signal corresponding to the difference signal into drive motor 19 of travelling carriage 20 and controls the speed of travelling carriage 20 so as to let the detected voltage Vd become equal to the reference voltage Vo. A good penetration bead is formed by the control mentioned above over the whole length of the weld line. According to the method for controlling a penetration bead, which is constituted as mentioned above, in an automatic one-side gas shielded arc welding. A penetration bead with a certain predetermined shape corresponding to the voltage Vd can be formed by controlling the detected voltage Vd between work pieces 1 and electrically conductive material 12 so as to let the detective voltage Vd always become equal to the reference voltage, whereby the penetration bead can be easily controlled. In the above-mentioned preferred embodiment, the voltage Vd between work pieces 1 and electrically conductive material 12 during welding is picked up directly. As illustrated in FIG. 6, it also is possible, however, to control the penetration bead by measuring a voltage between electrode 5 and work pieces as well as another voltage between electrode wire 5 and electrically conductive material 12 to control the difference between the two voltages so as to let the difference have a constant.

Electrically conductive material 12 having conductivity and, at the same time, a feature of being able to be melted by arc is preferrable. A metallic foil tape, a belt-like metallic net and a wire are desirable as electrically conductive material 12.

In the above-mentioned preferred embodiment, the case of using the mixed gas as the shielding gas consisting of 80% of argon gas and 20% of carbon dioxide gas is explained. In addition to the case, the method of the present invention can also so widely applied to other shielded arc welding such as carbon dioxide gas arc welding. MAG welding and MIG welding.

What is claimed is:

1. A method for controlling a penetration bead, in an automatic one-side gas shielded arc welding process wherein a backing material is adhered to the back of a pair of work pieces along a weld line and the welding is effected automatically from the surface side of the work pieces, comprising:

putting an electrically conductive material on a surface of said backing material for forming a penetration bead in a longitudinal direction of said weld line, said electrically conductive material being a material selected from the group consisting of a metallic foil tape, a metallic net and a metallic wire;

detecting a voltage between the work pieces and said electrically conductive material during the welding; and controlling the detected voltage so as to have a voltage equal to a predetermined reference voltage value.

2. The method of claim 1, wherein said step of controlling said voltage includes controlling a welding speed.

3. The method of claim 1, wherein said step of controlling voltage includes:

determining a difference voltage between said reference voltage and said detected voltage; and comparing said detected voltage with said predetermined reference voltage;

correcting a speed of a travelling carriage to control said detected voltage to have a value equal to said reference voltage value, said speed of said carriage corresponding to the difference between said values of said reference and detected voltages.

4. The method of claim 1, wherein;

said backing material has a slot therein; and said step of putting an electrically conductive material on said backing material includes putting said electrically conductive material on a surface of said slot of said backing material for forming said penetration bead.

5. The method of claim 4, wherein:

said electrically conductive material comprises a metallic foil tape which is put on said surface of said slot of said backing material for forming said penetration bead; and said step of controlling said detected voltage includes comparing said detected voltage value with said predetermined reference voltage value; determining a difference voltage between said reference voltage and said detected voltage; and correcting a speed of a travelling carriage to control said detected voltage to have a value equal to said reference voltage value, said speed of said carriage corresponding to the difference between said values of said reference and detected voltages.

6. The method of claim 1, wherein said electrically conductive material is a metallic foil tape.

7. The method of claim 1, wherein said electrically conductive material is a metallic net.

8. The method of claim 1, wherein said electrically conductive material is a metallic wire.

9. A method for controlling a penetration bead, in an automatic one-side gas shielded arc welding process wherein a backing material is adhered to the back of a pair of work pieces along a weld line and the welding is effected from the surface side of said work pieces, comprising:

putting an electrically conductive material on a surface of a backing material for forming a penetration bead in a longitudinal direction of said weld line;

determining a difference between two voltages during the welding, one of the two voltages being a voltage between an electrode wire and work pieces and the other of the two voltages being a voltage between the electrode wire and the electrically conductive material; and controlling said voltages so that said difference is substantially constant.

10. The method of claim 9, wherein said step of controlling said voltages includes controlling a welding speed.

11. The method of claim 9, wherein;

said backing material has a slot therein; and said step of putting an electrically conductive material on said backing material includes putting said electrically conductive material on a surface of said slot of said backing material for forming said penetration bead.

12. The method of claim 9, wherein the electrically conductive material is a material selected from the group consisting of a metallic foil tape, a metallic net and a metallic wire.

13. The method of claim 12, wherein said electrically conductive material is a metallic foil tape.

14. The method of claim 12, wherein said electrically conductive material is a metallic net.

15. The method of claim 12, wherein said electrically conductive material is a metallic wire.

* * * * *

UNITED STATES PATENT AND TRADEMARK OFFICE
CERTIFICATE OF CORRECTION

PATENT NO. : 4,876,432
DATED : October 24, 1989
INVENTOR(S) : SUGITANI et al

It is certified that error appears in the above-identified patent and that said Letters Patent is hereby corrected as shown below:

Column 1, line 33, "change" should read --changed--.

Column 4, claim 3, line 29, insert --said-- following "controlling".

Column 4, claim 3. Reverse lines 30-31 and lines 32-33 to read:

--comparing said detected voltage with said predetermined reference voltage;

determining a difference voltage between said reference voltage and said detected voltage; and--.

Signed and Sealed this

Second Day of April, 1991

Attest:

HARRY F. MANBECK, JR.

Attesting Officer

Commissioner of Patents and Trademarks